US012695519B2

(12) United States Patent
    Wu et al.

(10) Patent No.: US 12,695,519 B2
(45) Date of Patent: Jul. 28, 2026

(54) COMMUNICATION DEVICE AND COMMUNICATION METHOD

(71) Applicant: HTC Corporation, Taoyuan (TW)

(72) Inventors: Chun-Yih Wu, Taoyuan City (TW);
    Ta-Chun Pu, Taoyuan City (TW);
    Yen-Liang Kuo, Taoyuan City (TW)

(73) Assignee: HTC Corporation, Taoyuan City (TW)

( * ) Notice: Subject to any disclaimer, the term of this
    patent is extended or adjusted under 35
    U.S.C. 154(b) by 333 days.

(21) Appl. No.: 18/427,066

(22) Filed: Jan. 30, 2024

(65) Prior Publication Data

US 2025/0219742 A1    Jul. 3, 2025

(30) Foreign Application Priority Data

Dec. 29, 2023    (TW) ................................. 112151525

(51) Int. Cl.
    H04B 13/00        (2006.01)
    H04B 1/18         (2006.01)
    H04B 1/3827       (2015.01)
(52) U.S. Cl.
    CPC ............. H04B 13/005 (2013.01); H04B 1/18
        (2013.01); H04B 1/3838 (2013.01)
(58) Field of Classification Search
    CPC ....... H04B 1/3838; H04B 13/005; H04B 1/18
    See application file for complete search history.

(56) References Cited

U.S. PATENT DOCUMENTS

| | | | | |
|---|---|---|---|---|
| 2014/0087786 A1* | 3/2014 | Tani | ......................... | G06F 3/044 |
| | | | | 455/556.1 |
| 2016/0226545 A1* | 8/2016 | Tsai | ..................... | H04B 1/3838 |
| 2025/0008008 A1* | 1/2025 | Song | ...................... | H04M 1/18 |

FOREIGN PATENT DOCUMENTS

| | | |
|---|---|---|
| CN | 108461898 B | 10/2020 |
| CN | 215911573 U | 2/2022 |
| TW | I448697 B | 8/2014 |

* cited by examiner

*Primary Examiner* — John J Lee

(74) *Attorney, Agent, or Firm* — Birch, Stewart, Kolasch
& Birch, LLP

(57) ABSTRACT

A communication device includes an RF (Radio Frequency)
module, an integrated module, a first tuning circuit, a signal
transmission line, and a first antenna element. The RF
module generates an RF signal. The integrated module
includes a SAR (Specific Absorption Rate) sensor and an
HBC (Human Body Communication) module. The signal
transmission line includes a central conductor and an exter-
nal conductor. The RF signal is transmitted through the
signal transmission line to the first antenna element. The first
terminal of the HBC module is coupled through the first
tuning circuit to the central conductor, and the second
terminal of the HBC module is coupled to the external
conductor.

20 Claims, 7 Drawing Sheets

Provide an RF module, an integrated module,
a first tuning circuit, a signal transmission
line, and a first antenna element, wherein the
integrated module includes an SAR sensor
and an HBC module, and wherein the signal
transmission line includes a central conductor
and an external conductor —S710

Generate an RF signal by the RF module —S720

Transmit the RF signal to the first antenna
element by the signal transmission line —S730

Couple a first terminal of the HBC module
through the first tuning circuit to the central
conductor, and couple a second terminal of
the HBC module to the external conductor —S740

300

382

384

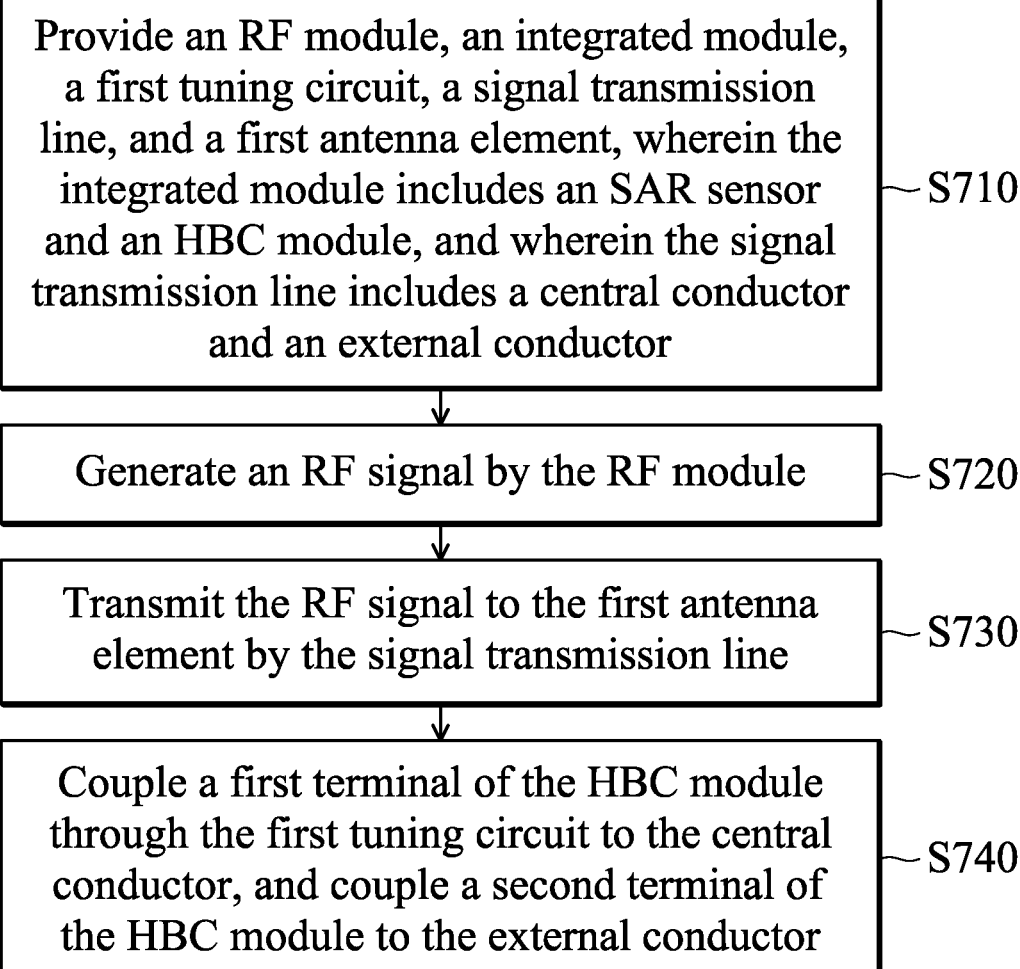

Provide an RF module, an integrated module, a first tuning circuit, a signal transmission line, and a first antenna element, wherein the integrated module includes an SAR sensor and an HBC module, and wherein the signal transmission line includes a central conductor and an external conductor ~S710

Generate an RF signal by the RF module ~S720

Transmit the RF signal to the first antenna element by the signal transmission line ~S730

Couple a first terminal of the HBC module through the first tuning circuit to the central conductor, and couple a second terminal of the HBC module to the external conductor ~S740

FIG. 7

COMMUNICATION DEVICE AND COMMUNICATION METHOD

CROSS REFERENCE TO RELATED APPLICATIONS

This application claims priority of Taiwan Patent Application No. 112151525 filed on Dec. 29, 2023, the entirety of which is incorporated by reference herein.

BACKGROUND OF THE INVENTION

Field of the Invention

The invention relates to a communication device, and more particularly, to a communication device and a communication method.

Description of the Related Art

In the field of mobile communication, it is difficult to accommodate many circuit elements within the limited internal space of the related communication device. Also, because these circuit elements are so close to each other, they may induce serious interference, and the overall operational performance of the device may be affected. Accordingly, there is a need to propose a novel solution for solving the problem of the prior art.

BRIEF SUMMARY OF THE INVENTION

In an exemplary embodiment, the invention is directed to a communication device that includes an RF (Radio Frequency) module, an integrated module, a first tuning circuit, a signal transmission line, and a first antenna element. The RF module generates an RF signal. The integrated module includes a SAR (Specific Absorption Rate) sensor and an HBC (Human Body Communication) module. The signal transmission line includes a central conductor and an external conductor. The RF signal is transmitted through the signal transmission line to the first antenna element. The HBC module has a first terminal and a second terminal. The first terminal of the HBC module is coupled through the first tuning circuit to the central conductor. The second terminal of the HBC module is coupled to the external conductor.

In some embodiments, the SAR sensor has a first terminal and a second terminal. The first terminal of the SAR sensor is coupled to the central conductor. The second terminal of the SAR sensor is coupled to the external conductor.

In some embodiments, the HBC module covers a first operational frequency band, and the first antenna element covers a second operational frequency band. The second operational frequency band is different from the first operational frequency band.

In some embodiments, the first operational frequency band is from 1 MHz to 100 MHz, and the second operational frequency band is higher than or equal to 700 MHz.

In some embodiments, the SAR sensor covers a third operational frequency band, and the third operational frequency band is from 0.7 GHz to 7 GHz.

In some embodiments, the second terminal of the HBC module is implemented with a metal element.

In some embodiments, the metal element is an FPC (Flexible Printed Circuit).

In some embodiments, the communication device further includes a nonconductive back cover. The FPC is disposed on the inner side of the nonconductive back cover.

In some embodiments, the metal element is a second antenna element.

In some embodiments, the first tuning circuit includes a first band-pass filter. The passing frequency band of the first band-pass filter is the same as the first operational frequency band.

In some embodiments, the first tuning circuit further includes a first switch element which is selectively closed or opened. The first switch element is coupled in series with the first band-pass filter.

In some embodiments, the communication device further includes a second tuning circuit. The second terminal of the HBC module is further coupled through the second tuning circuit to the external conductor.

In some embodiments, the second tuning circuit includes a second band-pass filter. The passing frequency band of the second band-pass filter is the same as the first operational frequency band.

In some embodiments, the second tuning circuit further includes a second switch element which is selectively closed or opened. The second switch element is coupled in series with the second band-pass filter.

In some embodiments, the communication device further includes a camera metal frame. The camera metal frame includes a first portion and a second portion, and a partition gap is formed between the first portion and the second portion.

In some embodiments, the first terminal of the HBC module is implemented with the first portion of the camera metal frame.

In some embodiments, the second terminal of the HBC module is implemented with the second portion of the camera metal frame.

In some embodiments, the communication device further includes an IMU (Inertial Measurement Unit) for determining whether the communication device is operating in a holding mode or a pocket mode.

In some embodiments, the communication device further includes a tunable matching circuit coupled between the IMU and the HBC module. If the communication device is operating in the holding mode, the tunable matching circuit will provide a first impedance value for the HBC module. If the communication device is operating in the pocket mode, the tunable matching circuit will provide a second impedance value for the HBC module.

In another exemplary embodiment, the invention is directed to a communication method that includes the steps of: providing an RF (Radio Frequency) module, an integrated module, a first tuning circuit, a signal transmission line, and a first antenna element, wherein the integrated module includes an SAR (Specific Absorption Rate) sensor and an HBC (Human Body Communication) module, and wherein the signal transmission line includes a central conductor and an external conductor; generating an RF signal by the RF module; transmitting the RF signal to the first antenna element by the signal transmission line; and coupling a first terminal of the HBC module through the first tuning circuit to the central conductor, and coupling a second terminal of the HBC module to the external conductor.

BRIEF DESCRIPTION OF DRAWINGS

The invention can be more fully understood by reading the subsequent detailed description and examples with references made to the accompanying drawings, wherein:

FIG. 7 is a flowchart of a communication method according to an embodiment of the invention.

DETAILED DESCRIPTION OF THE INVENTION

Figure 1:
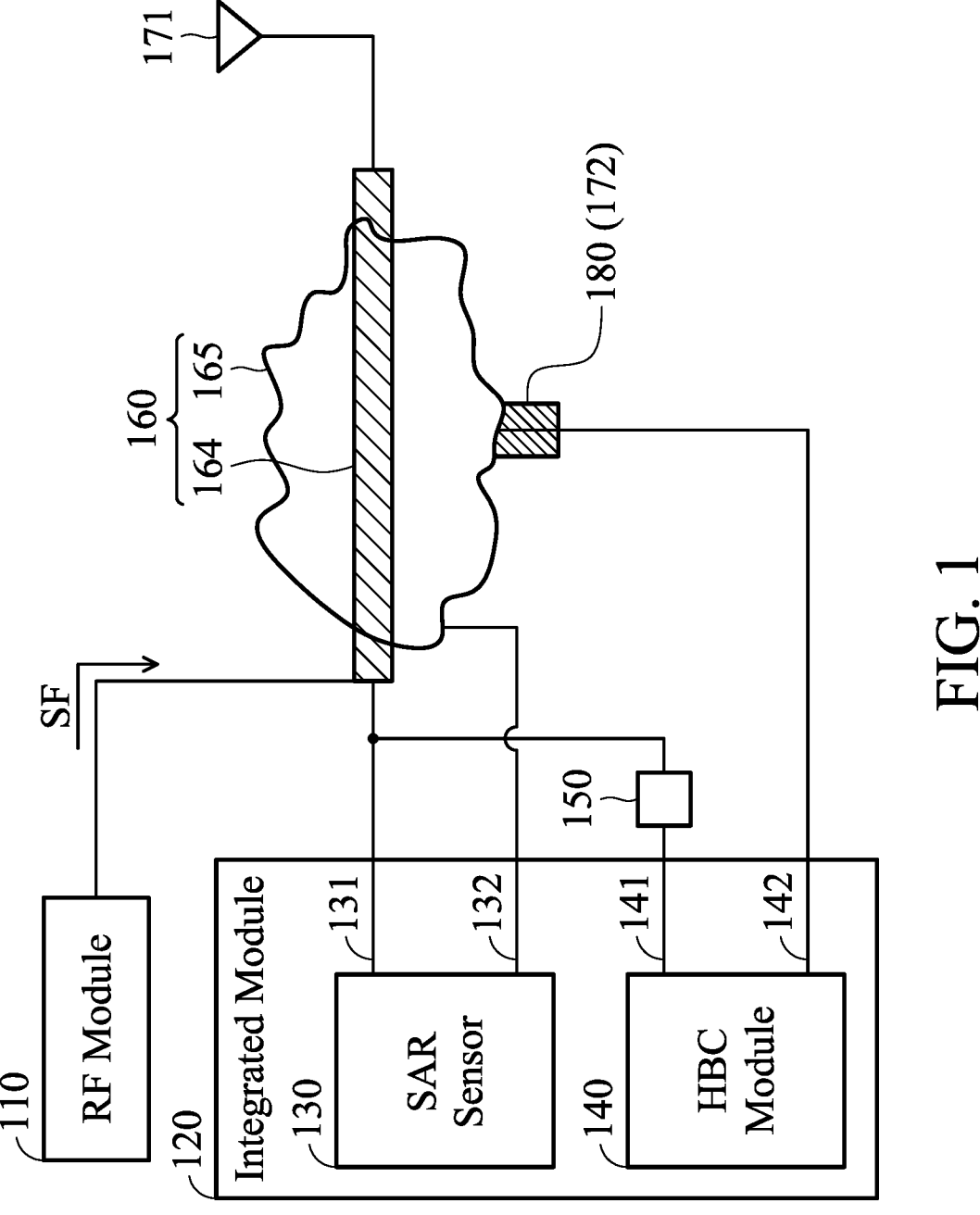
FIG. 1 is a diagram of a communication device according to an embodiment of the invention.

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a communication device 100 according to an embodiment of the invention. The communication device 100 may be applied in a mobile device, such as a smart phone, a tablet computer, or a notebook computer, but it is not limited thereto. In the embodiment of FIG. 1, the communication device 100 includes an RF (Radio Frequency) module 110, an integrated module 120, a first tuning circuit 150, a signal transmission line 160, and a first antenna element 171. It should be understood that the communication device 100 may further include other components, such as a housing, a speaker, and/or a power supply module, although they are not displayed in FIG. 1.

For example, the RF module 110 may be a transceiver. The RF module 110 is configured to generate an RF signal SF. The signal transmission line 160 includes a central conductor 164 and an external conductor 165. The RF signal SF is transmitted through the signal transmission line 160 to the first antenna element 171. However, the invention is not limited thereto. In alternative embodiments, the first antenna element 171 is configured to receive another RF signal, which is transmitted through the signal transmission line 160 to the RF module 110.

The integrated module 120 includes an SAR sensor 130 and an HBC module 140. For example, the SAR sensor 130 and the HBC module 140 may be integrated with other, and both of them may be implemented on a single IC (Integrated Circuit), but they are not limited thereto.

For example, the RF power of the RF module 110 may be adjustable according to the detection result of the SAR sensor 130. Specifically, the SAR sensor 130 has a first terminal 131 and a second terminal 132. The first terminal 131 of the SAR sensor 130 is coupled to the central conductor 164 of the signal transmission line 160. The second terminal 132 of the SAR sensor 130 is coupled to the external conductor 165 of the signal transmission line 160.

The HBC module 140 can receive or transmit a relative signal through an adjacent human body. Specifically, the HBC module 140 has a first terminal 141 and a second terminal 142. The first terminal 141 of the HBC module 140 is coupled through the first tuning circuit 150 to the central conductor 164 of the signal transmission line 160. The second terminal 142 of the HBC module 140 is coupled to the external conductor 165 of the signal transmission line 160. For example, in the HBC module 140, one of the first terminal 141 and the second terminal 141 may be used as a TX (Transmitter) pad, and the other of the first terminal 141 and the second terminal 141 may be used as an RX (Receiver) pad, but they are not limited thereto. It should be noted that the term "adjacent" or "close" over the disclosure means that the distance (spacing) between two corresponding elements is smaller than a predetermined distance (e.g., 10 mm or the shorter), or means that the two corresponding elements directly touch each other (i.e., the aforementioned distance/spacing between them is reduced to 0).

In some embodiments, the second terminal 142 of the HBC module 140 is implemented with a metal element 180. The metal element 180 is also coupled to the external conductor 165 of the signal transmission line 160. The metal element 180 may have different types and functions, which will be described in detailed over the following embodiments.

The type of the first antenna element 171 is not limited in the invention. For example, the first antenna element 171 may be a monopole antenna, a dipole antenna, a loop antenna, a PIFA (Planar Inverted F Antenna), or a chip antenna.

In some embodiments, the HBC module 140 covers a first operational frequency band, and the first antenna element 171 covers a second operational frequency band. The second operational frequency band is different from the first operational frequency band. For example, the first operational frequency band may be from 1 MHz to 100 MHz, and the second operational frequency band may be higher than or equal to 700 MHz, but they are not limited thereto. In addition, the SAR sensor 130 covers a third operational frequency band, which may be from 0.7 GHz to 7 GHz. Thus, the mutual interference between the HBC module 140 and each of the SAR sensor 130 and the first antenna element 171 can be relatively low.

Figure 2:
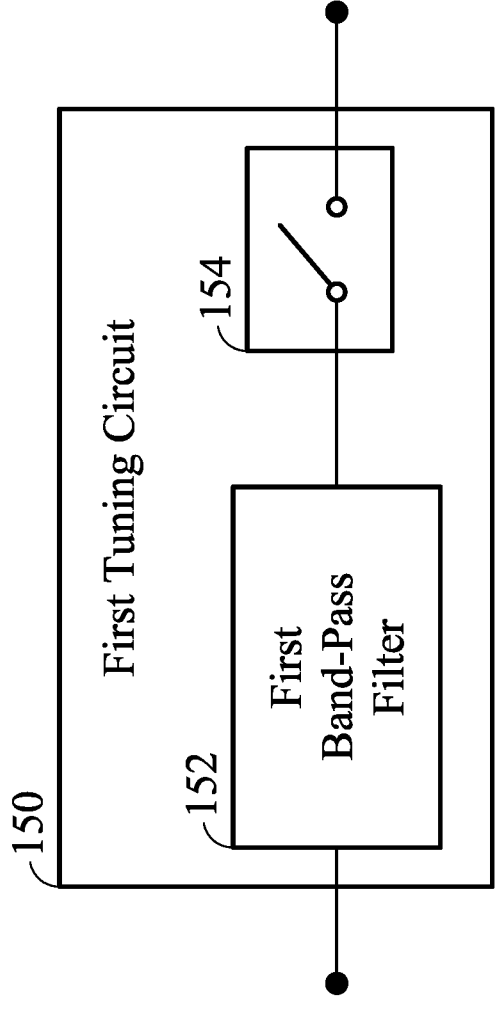
FIG. 2 is a diagram of a first tuning circuit according to an embodiment of the invention.

FIG. 2 is a diagram of the first tuning circuit 150 according to an embodiment of the invention. In the embodiment of FIG. 2, the first tuning circuit 150 includes a first band-pass filter 152 and a first switch element 154. For example, the passing frequency band of the first band-pass filter 152 may be the same as the aforementioned first operational frequency band. Furthermore, the first switch element 154 is selectively closed or opened. The first switch element 154 is coupled in series with the first band-pass filter 152. The first band-pass filter 152 is configured to remove noise outside the aforementioned first operational frequency band. If the noise is too serious, the first switch element 154 may be completely opened according to a control signal, so as to prevent the HBC module 140 from being negatively affected. However, the invention is not limited thereto. In alternative embodiments, the first tuning circuit 150 merely includes either the first band-pass filter 152 or the first switch element 154.

With the design of the invention, the communication device 100 can well integrate the SAR sensor 130 with the HBC module 140, and effectively suppress the interference between them. Therefore, the proposed communication device 100 can support the functions of both SAR sensing and HBC, without additionally increasing the overall device size.

The following embodiments will introduce different configurations and detail structural features of the communication device 100. It should be understood that these figures and descriptions are merely exemplary, rather than limitations of the invention.

Figure 3:
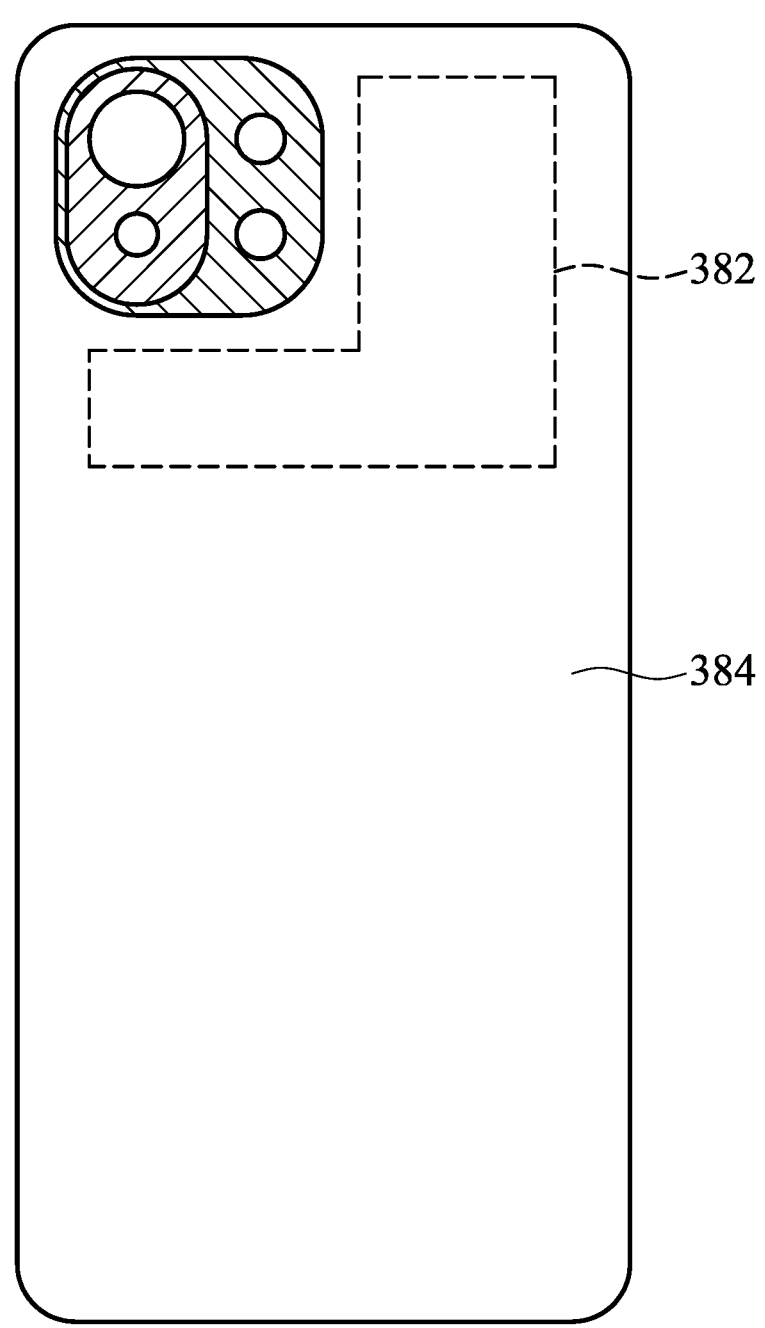
FIG. 3 is a diagram of a communication device according to an embodiment of the invention.

FIG. 3 is a diagram of a communication device 300 according to an embodiment of the invention. FIG. 3 is similar to FIG. 1. In the embodiment of FIG. 3, the communication device 300 further includes an FPC (Flexible Printed Circuit) 382 and a nonconductive back cover 384. The FPC 382 may be disposed on the inner side of the nonconductive back cover 384. A hand of a user may touch the outer side of the nonconductive back cover 384. For example, the metal element 180 (i.e., the second terminal 142 of the HBC module 140) may be the FPC 382. When the communication device 300 is hold by the hand of the user, there can be a capacitive coupling effect induced between the FPC 382 and the hand of the user, such that the FPC 382 can receive an HBC signal from the user. Other features of the communication device 300 of FIG. 3 are similar to those of the communication device 100 of FIG. 1. Accordingly, the two embodiments can achieve similar levels of performance.

Please refer to FIG. 1 again. In alternative embodiments, the metal element 180 is a second antenna element 172. There is relatively high isolation between the second antenna element 172 and the first antenna element 171. In addition, the type of the second antenna element 172 is not limited in the invention. It should be understood that the second antenna element 172 is merely an optional component, which is omitted in other embodiments.

Figure 4:
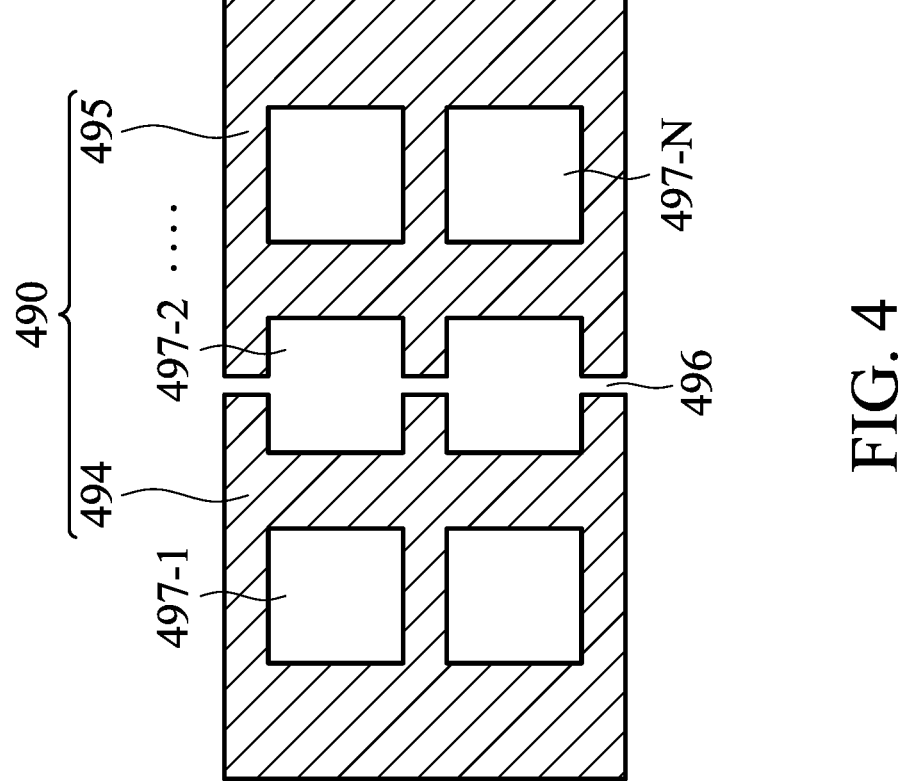
FIG. 4 is a diagram of a communication device according to an embodiment of the invention.

FIG. 4 is a diagram of a communication device 400 according to an embodiment of the invention. FIG. 4 is similar to FIG. 1. In the embodiment of FIG. 4, the communication device 400 further includes a camera metal frame 490, which may be arranged to correspond to a plurality of camera lenses (not shown). Specifically, the camera metal frame 490 includes a first portion 494 and a second portion 495. A partition gap 496 may be formed between the first portion 494 and the second portion 495 of the camera metal frame 490. For example, a nonconductive material (not shown) may fill the partition gap 496, and thus the first portion 494 and the second portion 495 of the camera metal frame 490 cannot directly touch each other. In some embodiments, the first terminal 141 of the HBC module 140 is implemented with the first portion 494 of the camera metal frame 490, and the second terminal 142 of the HBC module 140 is implemented with the second portion 495 of the camera metal frame 490, but they are not limited thereto. When the communication device 400 is hold by the hand of the user, there can be another capacitive coupling effect induced between the camera metal frame 490 and the hand of the user, such that the camera metal frame 490 can receive or transmit another HBC signal relative to the user. In addition, the camera metal frame 490 may have a plurality of openings 497-1, 497-2, . . . , and 497-N ("N" may be any integer which is greater than or equal to 2), so as to accommodate the camera lenses, respectively. For example, each opening may substantially have a rectangular shape, a square shape, or a circular shape, but it is not limited thereto. Other features of the communication device 400 of FIG. 4 are similar to those of the communication device 100 of FIG. 1. Accordingly, the two embodiments can achieve similar levels of performance.

Figure 5:
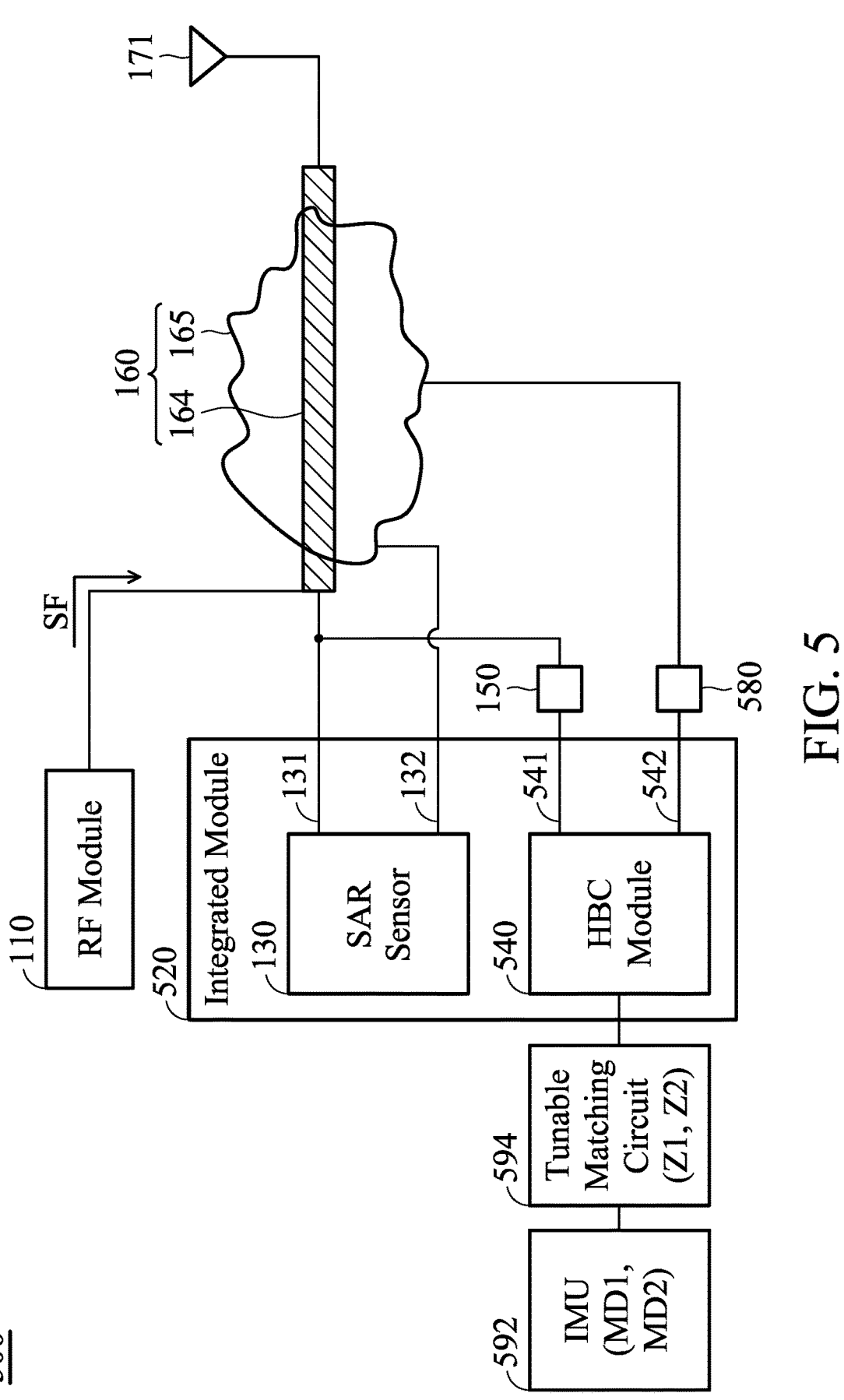
FIG. 5 is a diagram of a communication device according to an embodiment of the invention.

FIG. 5 is a diagram of a communication device 500 according to an embodiment of the invention. FIG. 5 is similar to FIG. 1. In the embodiment of FIG. 5, the communication device 500 further includes a second tuning circuit 580, an IMU (Inertial Measurement Unit) 592, and a tunable matching circuit 594. Furthermore, an HBC module 540 of an integrated module 520 of the communication device 500 has a first terminal 541 and a second terminal 542. The first terminal 541 of the HBC module 540 is coupled through the first tuning circuit 150 to the central conductor 164 of the signal transmission line 160. The second terminal 542 of the HBC module 540 is coupled through the second tuning circuit 580 to the external conductor 165 of the signal transmission line 160. The IMU 592 can detect the movement state of the communication device 500, so as to determine whether the communication device 500 operates in a holding mode MD1 or a pocket mode MD2. The tunable matching circuit 594 is coupled between the IMU 592 and the HBC module 540, and is controlled by the IMU 592. For example, if the communication device 500 operates in the holding mode MD1, the tunable matching circuit 594 may provide a first impedance value Z1 for the HBC module 540. Conversely, if the communication device 500 operates in the pocket mode MD2, the tunable matching circuit 594 may provide a second impedance value Z2 for the HBC module 540, and the second impedance value Z2 may be different from the first impedance value Z1. In other words, the tunable matching circuit 594 can perform a calibration and compensation process on the HBC module 540 in different operational modes, thereby optimizing the communication quality of the HBC module 540. Other features of the communication device 500 of FIG. 5 are similar to those of the communication device 100 of FIG. 1. Accordingly, the two embodiments can achieve similar levels of performance.

Figure 6:
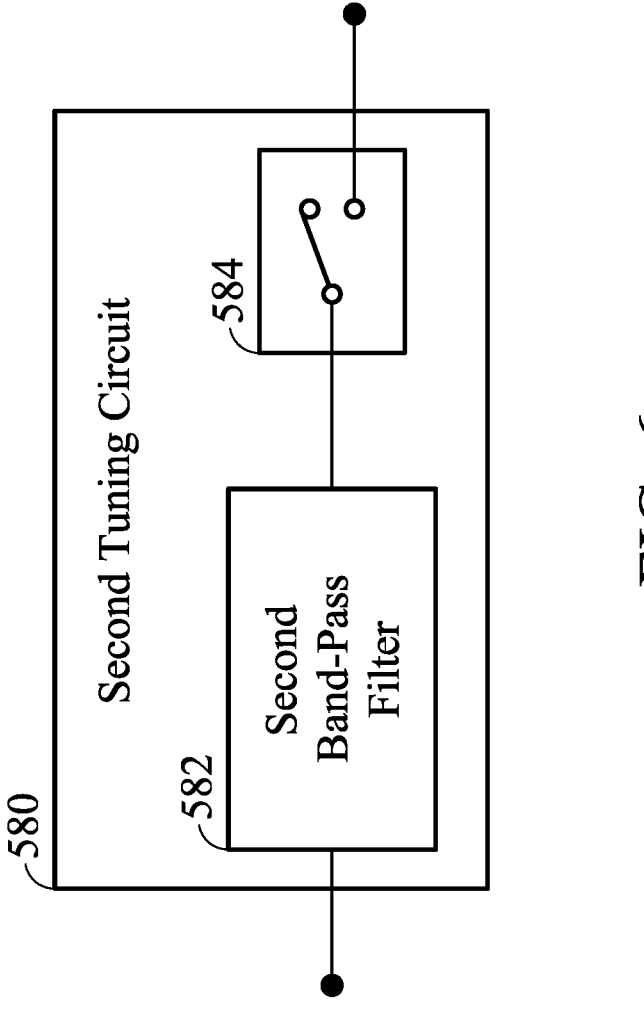
FIG. 6 is a diagram of a second tuning circuit according to an embodiment of the invention.

FIG. 6 is a diagram of the second tuning circuit 580 according to an embodiment of the invention. In the embodiment of FIG. 6, the second tuning circuit 580 includes a second band-pass filter 582 and a second switch element 584. For example, the passing frequency band of the second band-pass filter 582 may be the same as the aforementioned first operational frequency band. Furthermore, the second switch element 584 is selectively closed or opened. The second switch element 584 is coupled in series with the second band-pass filter 582. The second band-pass filter 582 is configured to remove noise outside the aforementioned first operational frequency band. If the noise is too serious, the second switch element 584 may be completely opened according to another control signal, so as to prevent the HBC module 540 from being negatively affected. However, the invention is not limited thereto. In alternative embodiments, the second tuning circuit 580 merely includes either the second band-pass filter 582 or the second switch element 584.

FIG. 7 is a flowchart of a communication method according to an embodiment of the invention. In step S710, an RF module, an integrated module, a first tuning circuit, a signal transmission line, and a first antenna element are provided. The integrated module includes an SAR sensor and an HBC module. The signal transmission line includes a central conductor and an external conductor. In step S720, an RF signal is generated by the RF module. In step S730, the RF signal is transmitted to the first antenna element by the signal transmission line. In step S740, a first terminal of the HBC module is coupled through the first tuning circuit to the central conductor, and a second terminal of the HBC module is coupled to the external conductor. It should be understood that these steps are not required to be performed in order, and every feature of the embodiments of FIGS. 1-6 may be applied to the communication method of FIG. 7.

The invention proposes a novel communication device and a novel communication method. In comparison to the conventional design, the invention has at least the advantages of integrating the SAR sensor with the HBC module, minimizing the overall device size, and reducing the overall manufacturing cost. Therefore, the invention is suitable for application in a variety of devices.

Note that the above element parameters are not limitations of the invention. A designer can fine-tune these setting values according to different requirements. It should be understood that the communication device and the communication method of the invention are not limited to the configurations of FIGS. 1-7. The invention may include any one or more features of any one or more embodiments of FIGS. 1-7. In other words, not all of the features displayed in the figures should be implemented in the communication device and the communication method of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A communication device, comprising:
an RF (Radio Frequency) module, generating an RF signal;
an integrated module, comprising an SAR (Specific Absorption Rate) sensor and an HBC (Human Body Communication) module;
a first tuning circuit;
a signal transmission line, comprising a central conductor and an external conductor; and
a first antenna element, wherein the RF signal is transmitted through the signal transmission line to the first antenna element;
wherein the HBC module has a first terminal and a second terminal, the first terminal of the HBC module is coupled through the first tuning circuit to the central conductor, and the second terminal of the HBC module is coupled to the external conductor.

2. The communication device as claimed in claim 1, wherein the SAR sensor has a first terminal and a second terminal, the first terminal of the SAR sensor is coupled to the central conductor, and the second terminal of the SAR sensor is coupled to the external conductor.

3. The communication device as claimed in claim 1, wherein the HBC module covers a first operational frequency band, the first antenna element covers a second operational frequency band, and the second operational frequency band is different from the first operational frequency band.

4. The communication device as claimed in claim 3, wherein the first operational frequency band is from 1 MHz to 100 MHz, and the second operational frequency band is higher than or equal to 700 MHz.

5. The communication device as claimed in claim 3, wherein the SAR sensor covers a third operational frequency band, and the third operational frequency band is from 0.7 GHz to 7GHZ.

6. The communication device as claimed in claim 3, wherein the first tuning circuit comprises:
a first band-pass filter, wherein a passing frequency band of the first band-pass filter is the same as the first operational frequency band.

7. The communication device as claimed in claim 6, wherein the first tuning circuit further comprises:
a first switch element, selectively closed or opened, wherein the first switch element is coupled in series with the first band-pass filter.

8. The communication device as claimed in claim 3, further comprising:

a second tuning circuit, wherein the second terminal of the HBC module is further coupled through the second tuning circuit to the external conductor.

9. The communication device as claimed in claim 8, wherein the second tuning circuit comprises:

a second band-pass filter, wherein a passing frequency band of the second band-pass filter is the same as the first operational frequency band.

10. The communication device as claimed in claim 9, wherein the second tuning circuit further comprises:

a second switch element, selectively closed or opened, wherein the second switch element is coupled in series with the second band-pass filter.

11. The communication device as claimed in claim 1, wherein the second terminal of the HBC module is implemented with a metal element.

12. The communication device as claimed in claim 11, wherein the metal element is an FPC (Flexible Printed Circuit).

13. The communication device as claimed in claim 12, further comprising:

a nonconductive back cover, wherein the FPC is disposed on an inner side of the nonconductive back cover.

14. The communication device as claimed in claim 11, wherein the metal element is a second antenna element.

15. The communication device as claimed in claim 1, further comprising:

a camera metal frame, comprising a first portion and a second portion, wherein a partition gap is formed between the first portion and the second portion.

16. The communication device as claimed in claim 15, wherein the first terminal of the HBC module is implemented with the first portion of the camera metal frame.

17. The communication device as claimed in claim 15, wherein the second terminal of the HBC module is implemented with the second portion of the camera metal frame.

18. The communication device as claimed in claim 1, further comprising:

an IMU (Inertial Measurement Unit), determining whether the communication device is operating in a holding mode or a pocket mode.

19. The communication device as claimed in claim 18, further comprising:

a tunable matching circuit, coupled between the IMU and the HBC module, wherein if the communication device is operating in the holding mode, the tunable matching circuit provides a first impedance value for the HBC module, and if the communication device is operating in the pocket mode, the tunable matching circuit provides a second impedance value for the HBC module.

20. A communication method, comprising the steps of:

providing an RF (Radio Frequency) module, an integrated module, a first tuning circuit, a signal transmission line, and a first antenna element, wherein the integrated module comprises an SAR (Specific Absorption Rate) sensor and an HBC (Human Body Communication) module, and wherein the signal transmission line comprises a central conductor and an external conductor;

generating an RF signal by the RF module;

transmitting the RF signal to the first antenna element by the signal transmission line; and coupling a first terminal of the HBC module through the first tuning circuit to the central conductor, and coupling a second terminal of the HBC module to the external conductor.

* * * * *